Figure 5:
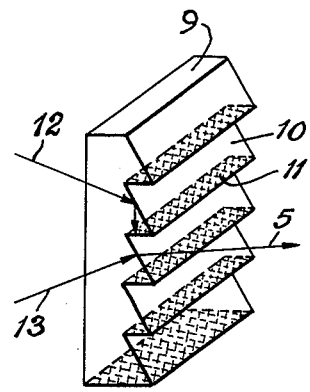

May 19, 1964  M. PLOKE  3,134,021
PHOTOELECTRIC EXPOSURE METERS WITH LIGHT RAY LIMITERS
Filed July 25, 1960  3 Sheets-Sheet 1
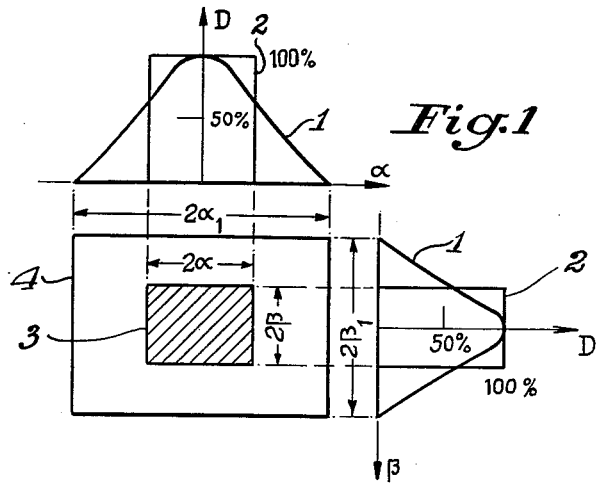
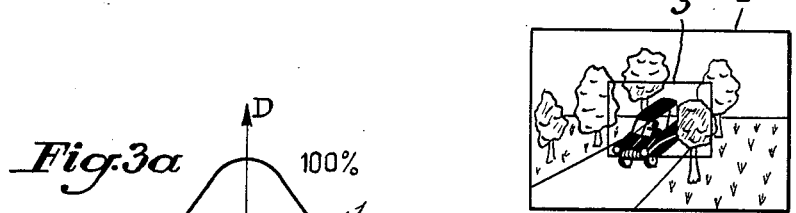
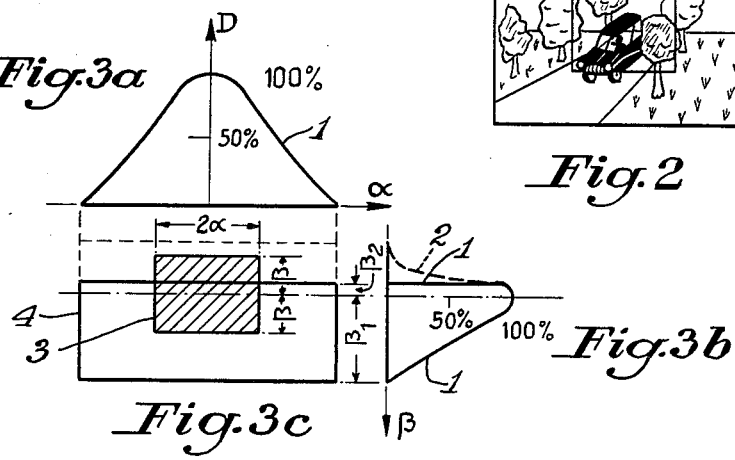
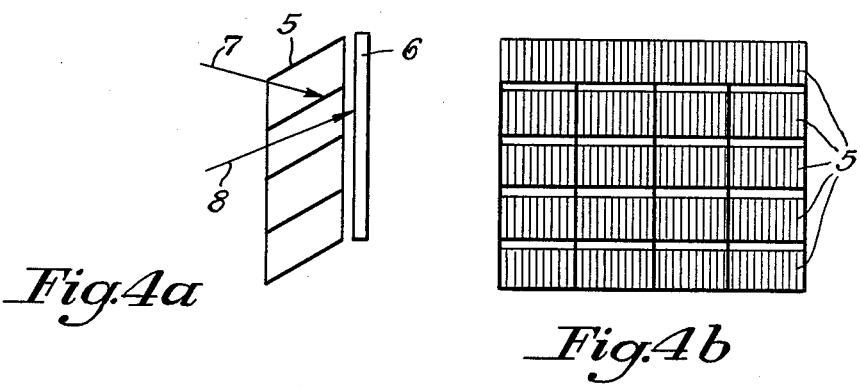

United States Patent Office 3,134,021
Patented May 19, 1964

3,134,021
PHOTOELECTRIC EXPOSURE METERS WITH
LIGHT RAY LIMITERS
Martin Ploke, Preetz, Holstein, Germany, assignor to
Zeiss Ikon Aktiengesellschaft, Stuttgart, Germany
Filed July 25, 1960, Ser. No. 44,947
Claims priority, application Germany Aug. 1, 1959
2 Claims. (Cl. 250—229)

This invention relates to photoelectric exposure meters with light ray limiters.

It is known to provide photoelectric exposure meters with light ray limiting means in order to exclude undesirable side light and admit to the photocell only the light from the object to be photographed and possibly light from the close surroundings of said object. For this purpose for example lenticular screens or step screens are employed but also lenses or lens screens in combination with diaphragms. In the dimensioning of the ray limiter a compromise must be made between two contrary requirements. On one hand, it is desirable to admit as much light as possible to the photocell in order to enable the use of a rugged and robust indication instrument. This leads to the admission of light for measuring also from objects outside the image scene. On the other hand, the angle of inclination of the light rays admitted through the ray limiter must not materially exceed the image angle of the objective in order to prevent significant adulteration due to counterlight or light sources outside the scene. The effect of the measures hitherto taken for this purpose is explained with reference to FIG. 1 in the accompanying drawings which is a representation of the light penetrability of the limiter in relation to the angle of inclination of the incident light rays. Shown are curves for the angular distribution of the penetrability in the horizontal and vertical directions, and the showing relates to a definite technical embodiment with the limiting angles $\alpha_1$ and $\beta_1$ (curves 1) and to a limiter (curve 2) which is in many cases considered ideal and has a penetrability within the image angles $\alpha$, $\beta$ of the camera objective of 100% but for greater angles zero. FIG. 1 shows also the relative position of the image field 3 of the camera and the surrounding field 4 of the exposure meter. The known exposure meters are usually so arranged that the image field 3 is positioned approximately symmetrically within the surrounding field 4 utilized for the exposure determination.

Experience has shown that a penetrability characteristic according to the curves 2 in FIG. 1 in far from all cases ensures an exposure light corresponding to expectations. Take, for example, a landscape scene as in FIG. 2 with and without a dark object in the foreground, such as a vehicle. Assume that two exposure meters I and II with penetrability characteristics according to curves 1 and 2 are available for the measuring. The exposure meter I measures the image scene 3' including the surrounding field 4', while exposure meter II responds to the image scene alone. Without the dark vehicle the exposure meters I and II give approximately the same reading but with the vehicle the exposure meter II shows a lower value than exposure meter I. With exposure meter I it is accordingly possible to obtain a picture in which the landscape is correctly reproduced while the dark vehicle is incorrectly exposed. The lower reading on the exposure meter II leads to incorrect exposure of the landscape but, on the other hand, to an improved reproduction of the vehicle. Particularly in moving picture production it is frequently desired to avoid a fluctuating tone reproduction of the background with changing foreground. For this use exposure meter I is preferable to exposure meter II. Thus, it is obvious that in the exposure measuring the cooperation of the surrounding field is indispensible not only due to the superior light capturing capacity of the exposure meter but also with regard to constant exposure of the image background.

On the other hand, it is possible to mention examples of objects to be photographed in which the surrounding field may cause an incorrect exposure and, therefore, the degree of cooperation of the surrounding field must not be too high. Such is the case, for example, when strong sources of light or the sun are within the surrounding field. Particularly in the case of counterlight incorrect exposures are to be expected if exposure meters with penetrability curves corresponding to curves 1 and 2 in FIG. 1 are employed. The known exposure meters give in counterlight frequently a too high value which leads to under-exposure of the foreground or the interesting image portions, respectively. In practice, this difficulty is many times overcome by opening the diaphragm of the camera one step wider than the indication on the exposure meter in the case of counterlight. To the user of the exposure meter it is also often recommended to incline the exposure meter downwardly in the case of a bright sky in order to measure those parts of the foreground perfectly which are important to the picture. It is obvious that these methods are not useable, e.g., with moving picture cameras or cameras with automatic diaphragm setting by means of the exposure meter. Here the invention comes in. The light ray limiter for exposure meters is so arranged that the angle of the ray bundle striking the photocell is asymmetrically restricted in respect of the preferably horizontal center line of the object section to be photographed, without even partially shutting out the light within said angle.

As is known, the counterlight arrives in the objective from obliquely overhead and is active at most to the middle of the image, mostly only in the upper part of the surrounding field. Due to this fact, the ray limiter is so arranged that its upper limitation corresponds to a line which lies between the preferably horizontal center line of the object section to be photographed and the upper boundary parallel therewith. The upper limitation may also be positioned in the upper portion of the surrounding field of the section to be photographed. An exposure meter with a ray limiter of the kind set forth thus has the property of ensuring perfect exposure of the important parts of the object to be photographed even in the case of counterlight exposure, without losing the advantageous properties of an exposure meter which additionally evaluates light from the surrounding field.

Such ray limiters have penetrability characteristics according to FIG. 3. FIG. 3$a$ shows the angular distribution of the penetrability capacity in the horizontal direction, FIG. 3$b$ in the vertical direction, and FIG. 3$c$ the position of the image field 3 of the camera objective in relation to the penetrability range 4 of the light limiter. An essential feature of the invention is the assymmetry shown in FIG. 3$b$. Preferably, the condition $\beta_2 < \beta$ should be met, i.e. the upper edge of the penetrabiilty region of the light limiter should lie between the image middle and the upper image boundary (curve 1 in FIG. 3$b$). However, it is also within the scope of the invention to partly consider the upper portion of the surrounding field in which case the principal decrease of the penetrability characteristic suitably takes place in the region between the image middle and the upper image edge or in the vicinity of the upper image edge (curve 2 in FIG. 3$b$). This can be achieved by weakening the ray bundle within the boundary angle in such a manner that the main decline of the penetrability characteristic lies in the regions between the image middle and the upper image boundary edge.

The invention is further explained below with reference to the accompanying drawings, in which—

Figure 6:
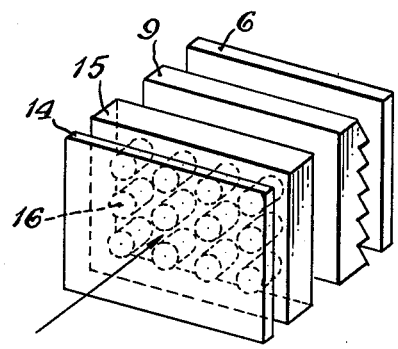
Figure 7:
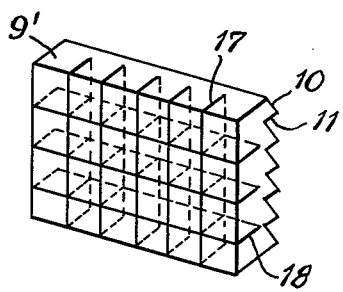
Figure 8:
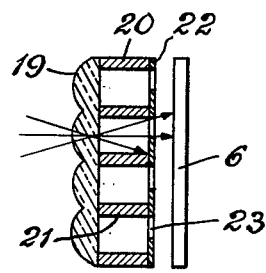
Figure 9:
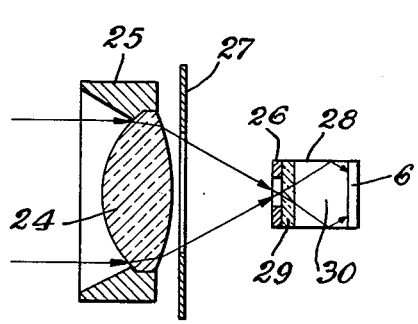
Figure 10:
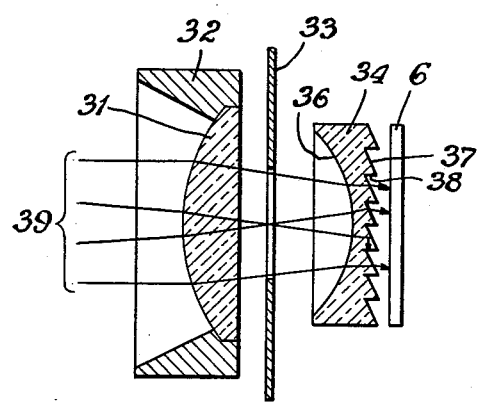
Figure 11:
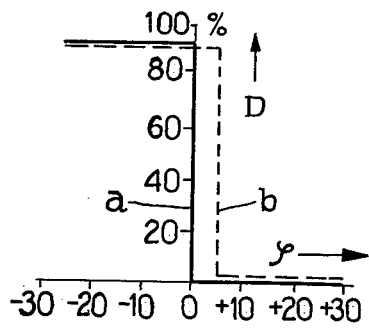
Figure 12:
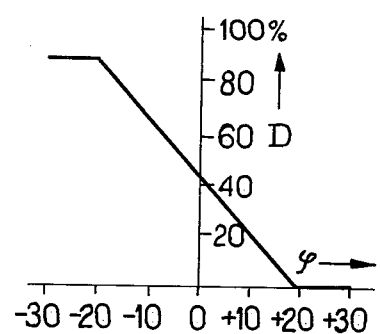
Figure 13:
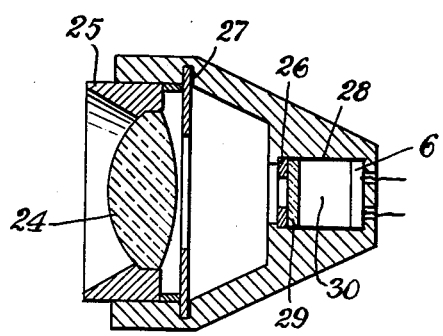
Figure 14:
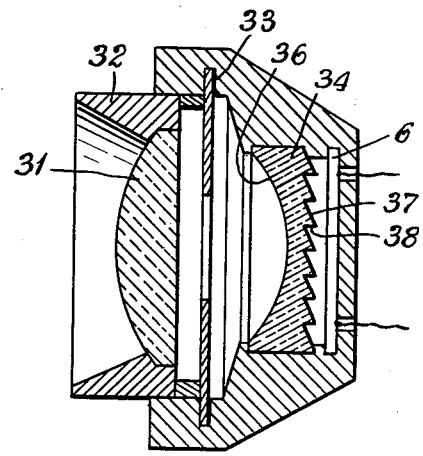

FIGS. 1, 2, 3a, 3b, and 3c illustrate basic conditions as described above,

FIGS. 4a and 4b are an end view and a front view, respectively, of one form of ray limiting means according to the invention, FIGS. 5, 6, and 7 are perspective views of other embodiments of the invention, FIGS. 8, 9, and 10 are axial sections of further embodiments, FIGS. 11 and 12 are graphs illustrating certain conditions in connection with the invention, and FIGS. 13 and 14 are axial sections showing the mounting of the elements of the exposure meters of FIGS. 9 and 10, respectively.

Light ray limiters with the proposed properties can be made in different ways. A particularly simple solution is represented by the step screen which is shown in vertical section in FIG. 4a and in front elevation in FIG. 4b. The steps which are inclined in vertical section are designated 5, while 6 is the photocell and the arrows 7 and 8 indicate two incidence directions of the light.

Instead of a step screen, a screen with cylindrical bores may also be used which has the axes of the bores inclined in the sense of the desired penetrability characteristic. The screen disc is in both cases suitably made of a transparent material preferably plastic, with transparent steps while the separate channels formed by the screen have light absorbing surfaces. To light rays from the direction of the arrow 7 (FIG. 4a) the road to the photocell 6 is barred, while rays from the direction of the arrow 8 up to a critical angle of inclination which also is determined by the chosen design of the step screen, can reach the photocell so that the total effect of the step screen may be described through a characteristic as shown in FIG. 12.

Step screens of this kind have beside the mentioned advantages the disadvantage which is evident from FIG. 12 that the penetrability of the light rays coming on a slant from above decreases only gradually with increasing angle of incidence. In many cases a penetrability of the ray limiter is desirable which in dependence upon the angle of incidence varies as indicated in FIG. 11. With a parallel prismatic screen arranged on a transparent plate this is achieved according to the invention by placing the prismatic screen on the side of the ray limiter in front of the photocell that faces away from the incident light.

It is known to use prismatic screens for ray restriction purposes, and such prismatic screen discs do within certain angle ranges bar the incident ray bundle. However, said ranges are crossed by regions within which no total reflection takes place so that the desirable sharp differentiation cannot be accomplished. The reason for this circumstance is that the prismatic screen is disposed on the light incidence side of the screen plate.

A ray limiter with the feature that the prismatic screen is disposed on the opposite side from the light incidence is shown in FIG. 5. It comprises essentially a transparent plastic plate, or sheet, 9 provided with prism surfaces 10 and 11 on the rear side. The inclination of the surface 10 is selected so that a ray incident in the arrow direction 12 is totally reflected thereby and absorbed by the surface 11 which is coated with a light absorbing material. Less inclined rays are not totally reflected by the surface 10 and, therefore, impinge upon the photocell that is disposed behind the screen. The rays incident on a slant from below in the direction of the arrow 13 can also pass unobstructed through the screen and impinge upon the photocell. Thus the penetrability characteristic a in FIG. 11 is obtained which according to the inclination of the surface 11 in FIG. 5 is subject to change in the sense of the line b in FIG. 11.

Since, as is well known, the total reflection occurs at a sharply defined critical angle which is determined only by the change of refraction index on the light emergence side of the material, the prismatic screen obtains the property of separating the light rays with undesirable angles of inclination before they impinge upon the photocell, the critical angle of inclination thereby being freely selective in accordance with the points of view set forth. In order to restrict also the angles of inclination of the light rays incident from the side and from below in a similar manner, a plurality of parallel prismatic screens with different orientation may be arranged behind each other.

FIG. 6 shows another embodiment of the invention. In said embodiment the ray limiter in front of the photocell 6 comprises a cover plate 14, a transparent plate 15 having parallel bores 16, the inner walls of which are suitably blackened, and a prismatic screen plate 9 with the features expalined in connection with FIG. 5.

A structural simplification can be accomplished by combining the plate 15 having the parallel bores with the prismatic screen plate to form a single unit. Instead of the parallel bore plate a parallel screen of known type may be used and combined with the prismatic screen plate to a single unit, as shown in FIG. 7. The plate 9' is, for instance, provided with the cuts 17 and 18 on the light incidence side, while on the opposite side the prismatic screen with the differently inclined surfaces 10 and 11 is disposed.

The teaching of the present invention is also applicable upon light restricting means with lenticular screens. The embodiment of FIG. 8 comprises a lenticular screen 19, a limiter plate 20 with parallel bores 21, and a rear plate 22 with corresponding rectangular apertures 23 behind which the photocell 6 is disposed. The individual lenses of the lenticular screen form in the plane of the rear plate real images of the scene to be photographed. According to the invention the rectangular apertures 23 are so arranged that they form the real images mask sections corresponding to the surrounding field 4 in FIG. 3. The rectangular apertures then are arranged eccentrically with regard to the optical axes of the screen lenses. This device also gives a penetrability characteristic according to FIG. 3.

Even complex limiters with a plurality of lenticular lens screens may be improved in the inventive manner. This is particularly true for a photoelectric exposure meter which comprises an optical system in front of the light sensitive layer with a diaphragm disposed in the focus of said optical system which diaphragm restricts the image field of the objective and, in addition, a variable diaphragm as an opening diaphragm arranged in an image plane of the front objective pupil, the diaphragm restricting the image field of the objective and being disposed eccentrically with regard to the optical axis of the front optical system.

A preferred embodiment of this kind is shown diagrammatically in cross-section in FIG. 9 and with a suitable mounting frame in FIG. 13. The collective lens 24 in the frame 25 produces a real image in the plane of the rectangular diaphragm 26. The reference character 27 designates a variable iris diaphragm which permits a continuous control of the light flow and also may be used as a control member for a diaphragm regulator which is automatically adjustable by the photocell 6. The reference mark 29 indicates a ground-glass plate, 28 in a cell with an inner reflecting surface 30 which delivers all the light passed by the ground-glass plate to the photocell 6. Also in this device the eccentric arrangement of the rectangular diaphragm is essential which achieves the inventive penetrability characteristic. The arrangement has, in addition, the advantage that also with a small surface of the photocell a good proportionality between the surface of the passage aperture of the diaphragm 27 and the light flow absorbed by the photocell is achieved.

A further embodiment which relates to an exposure meter with a front telecentric optical system is illustrated in FIGS. 10 and 14. The device comprises a collective lens 31 in the frame 32 that acts as a sun shield, an iris diaphragm 33, and a dispersing lens 34 provided with prismatic screen and behind which the photocell 6 is disposed. The preferably planoconvex collective lens 31 and the—apart from the prismatic screen—planoconcave dispersing lens 34 cooperate as a reducing telecentric system which preferably is spherically corrected in the manner that the surface 36 of the dispersing lens is formed as a nonspherical surface. In this way it is achieved that the light beam within the dispersing lens 34 proceeds accurately telecentrically so that the prismatic screen on said lens with transparent surfaces 37 and blackened surfaces 38 acts as described above and restricts the angle of inclination of the incident light rays 39. Through the selected telecentrical ray passage the photocell 6 receives more light than without the lens system. By means of the diaphragm the light flow reaching the photocell is continuously controllable, and the critical angle for the vertically incoming rays is independent of the size of the diaphragm opening. The light restriction in the horizontal direction results from the in each separate case selected dimensions of the lens system. With the arrangement according to FIGS. 10 and 14 the advantage is connected that it renders it possible to achieve a sharply defined vertical restriction with an optical system of high intensity and a continuous diaphragm regulation. Such a system is particularly suitable for photographic and moving picture apparatus with automatic light dependent diaphragm regulation.

The described devices all relate to the control case when the counterlight arrives inclinedly from above in the exposure meter. However, also in the cases when the counterlight comes from the side or even from below the arrangements retain their effect when according to another feature of the invention either the entire exposure meter or at least the light limiter is rotatably secured in the casing of the exposure meter or in the camera. The user then through rotation of the light limiter has the possibility of angularly restricting the light incident in the direction from which the counterlight arrives.

It is believed that the foregoing description conveys a good understanding of the objects and advantages of the invention. The appended claims have been drawn to cover all legitimate modifications and adaptations.

What I claim is:

1. In a photoelectric exposure meter, a photocell, a light ray limiter, and means interconnecting said photocell and light ray limiter so that light rays passing through said light ray limiter impinge upon said photocell, said light ray limiter comprising a transparent plate having a series of horizontally extending parallel prism surfaces on one side thereof forming a prismatic screen facing the photocell with the steps of said horizontally extending parallel prism surfaces being inclined to the normal of said photocell and in a direction away from the direction of the required penetrability characteristic whereby said light ray limiter will restrict a light ray beam which has an incident angle the upper boundary of which is disposed within the upper portion of the surrounding field of an object section to be photographed, and a telecentrical optical system located in front of said photocell, a positive member in said optical system, and a negative member in said optical system, said negative member having a first surface which is concave and nonspherical and having a second surface on which are formed said parallel prismatic surfaces of said prismatic screen.

2. A device as set forth in claim 1, including an adjustable diaphragm located in the focal plane of said positive member.

References Cited in the file of this patent

UNITED STATES PATENTS

| | | |
|---|---|---|
| 1,789,230 | Heaton | Jan. 13, 1931 |
| 2,182,987 | Hopkins | Dec. 12, 1939 |
| 2,206,196 | Kubitzek | July 2, 1940 |
| 2,700,916 | Muirhead | Feb. 1, 1955 |
| 2,742,578 | Nicolson et al. | Apr. 17, 1956 |
| 2,841,064 | Bagby et al. | July 1, 1958 |
| 2,906,187 | Dotson et al. | Sept. 29, 1959 |

FOREIGN PATENTS

| | | |
|---|---|---|
| 148,264 | Austria | Jan. 11, 1937 |
| 1,214,121 | France | Nov. 9, 1959 |
| 745,777 | Germany | Nov. 30, 1944 |
| 429,340 | Great Britain | May 27, 1935 |
| 475,203 | Great Britain | Nov. 16, 1937 |